United States Patent [19]

Berg

[11] 4,257,465
[45] Mar. 24, 1981

[54] LOCK WASHER
[75] Inventor: Dennis G. Berg, East Rockaway, N.Y.
[73] Assignee: Winfred M. Berg, Inc., East Rockaway, N.Y.
[21] Appl. No.: 29,315
[22] Filed: Apr. 12, 1979
[51] Int. Cl.³ .............................................. F16B 39/24
[52] U.S. Cl. .................................. 411/147; 411/163; 411/544; 411/908
[58] Field of Search ................... 151/38, 35; 85/50 R, 85/1 JP, 62

[56] References Cited
U.S. PATENT DOCUMENTS 3,212,387  10/1965  Madansky ......................... 151/38 X
3,519,279  7/1970   Wagner ............................ 85/1 JP X
3,572,414  3/1971   Onufer ............................. 85/1 JP X Primary Examiner—Ramon S. Britts
Attorney, Agent, or Firm—Alexander C. Wilkie, Jr.

[57] ABSTRACT

An improved lock washer is described for locking nuts or bolts into their fastened positions. A molded plastic washer has a series of integral dimples or lock projections extending radially outwardly and downwardly from one of the washer contact surfaces. These integral projections are turned circumferentially during the tightening of the nut or bolt and the circumferential positioning of the dimples resists an unscrewing movement of the nuts or bolts.

10 Claims, 5 Drawing Figures

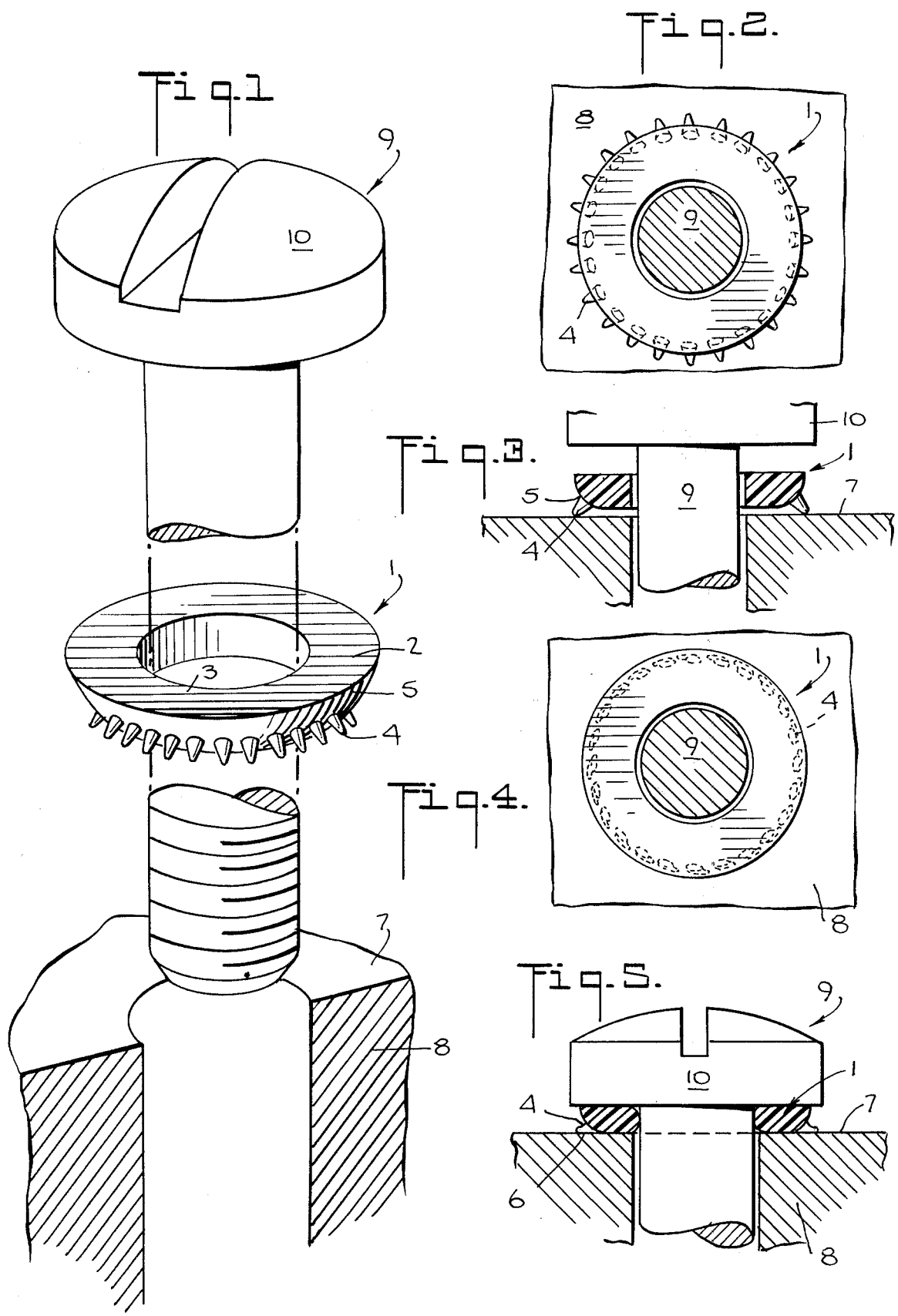

LOCK WASHER

BACKGROUND OF THE INVENTION

The present invention relates to screw and washer assemblies and more particularly to a lock washer for use with nuts or bolts to prevent their unintentional loosening. The molded plastic washer includes a number of integral dimples or projections having an original radial orientation. This orientation causes the projections to assume at least a partial circumferential position during nut or bolt application that resists the nut or bolt removal.

Accordingly, an object of the present invention is to provide an improved lock washer which is simply formed by molding and which, being formed of plastic material, provides in addition, a liquid seal, electrical insulation, a non-marring character, and provides a washer which is idealy for use with rough or uneven surfaces.

Other and further objects of the present invention will become apparent upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawing, forming a part of the specification, wherein:

FIG. 1 is a perspective view illustrating a preferred embodiment of the washer for locking a bolt into position.

FIG. 2 is a horizontal sectional view of the assembly of FIG. 1 illustrating the lock washer before it has been tightened.

FIG. 3 is a vertical sectional view illustrating the washer in position on a bolt before the bolt is tightened.

FIG. 4 is a sectional view of the washer in its tightened or locked position with the projections having been turned circumferentially.

FIG. 5 is a vertical sectional view illustrating a tightened bolt with the lock washer of the invention in its locking position corresponding to FIG. 4.

DETAILED DESCRIPTION OF THE INVENTION

There are a variety of lock washer designs which add removal resisting forces at the lock washer surface to resist the removal of screwed elements such as nuts and bolts and particularly their unintentional removal. Most such prior washers have been metallic so that the retention resisting means is an integral metallic portion of the washer. This results in a washer which may have limited effect on uneven surfaces and which tends to mar the connected surfaces. While certain of these prior washers may have spring-like characteristics, others of them have been permanently deformed upon application making them unsuitable for reuse.

The washer of the present invention overcomes these difficulties because of its novel formation of molded plastic with integral plastic locking dimples or projections. Additionally, the projections themselves are formed so that they are resiliently deformable during the washer application. The projections thus are aligned during the nut or bolt application in such a manner that they have a significant circumferential or reverse rotation resisting action thereby locking the nut or bolt in its assembled position.

As illustrated in the drawing, a preferred embodiment of the washer 1 has a ring like molded plastic body 2 with a generally flat bolt or nut engaging surface 3 on one side and with projections 4 extending axially and outwardly from a rounded surface 5 on the opposite side. Preferably the projections 4, extend completely around the washer 1 with a generally uniform spacing. A preferred shape to permit the desired deformation during application and the subsequent removal resisting torque is provided by the generally conical form illustrated. This form provides for a significant friction or locking surface 6 between each projection 4 and the attached surface 7 of the connected article.

As seen in FIG. 3, the initial assembly of the washer 1 around a bolt 9 beneath the head 10 has the flat surface 3 facing the bolt head 10 and the projections 4 engaging the connected surface 7. Each of the outer ends of the projections 4 engage the surface 7 below the adjacent surface 5 of the washer 1. As the bolt 9 is turned into its engaged position, it will engage the washer 1 causing it to initially turn about the bolt 9 and on the connected surface 7. This rotation causes each of the projections 4 to have at least a partially circumferential movement causing the projections to to align themselves in a generally circumferential position as illustrated in FIG. 4. When the bolt 9 has been completely tightened, the projections 4 will be pressed between the washer 1 and the surface 7 into the generally circumferential position as illustrated. With the points of the projections 4 in this position they engage the connected surface 7 and act to prevent rotation of the bolt 9 in the opposite or removal direction. This provides a significant removal resisting or locking function thereby preventing unintentional disengagement of this threaded connection. Because of the plastic material of which the washer and the projections are formed, the above described locking action occurs without marring the connected surfaces and the resilient nature of the washer 1 and the projections 4 accomodates the washer and projections to rough or uneven surfaces as the plastic adapts itself to the particular surface being used.

The lock washer 1 resists the forces encountered during normal product or article use to prevent unintentional disconnection, however, a nut or bolt or other screwed member may be removed using suitable wrenches whereupon the application of sufficient force will overcome the locking action. The plastic projections 4 will tend to resume their original generally radial position so that the washer 1 may be effectively used for a number of connections and disconnections.

A preferred material for the above described lock washer is plastic such as polyurethane. The washer may also be molded of other plastics which have similar toughness and resiliency characteristics.

It will be seen that an improved lock washer has been provided which combines relatively simple manufacture with the additionally desirable properties of being suitable for use on rough surfaces and which will not mar the connected surfaces and which provides a liquid seal as well as electrical insulating properties.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A unitary molded lock washer for securing threadedly connected elements comprising:
   a washer body having opposite faces for engaging the coupled elements;
   one of said opposite faces being planar and the other having an inner planar portion whose outer edge portion curves towards the outer edge of said other face;
   an aperture in said washer body;
   a plurality of integral projections on said washer positioned around said aperture; and
   said projections extending outwardly of the body from the curving portion of said other washer body face and having their free ends projecting beyond the plane of said other face.

2. The lock washer as claimed in claim 1, in which the said projections are generally conically shaped with their larger ends being their connected ends.

3. The lock washer as claimed in claim 1 in which said aperture is generally cylindrical.

4. The lock washer as claimed in claim 1 in which said washer body is annular.

5. The lock washer as claimed in claim 1 which is molded of polyurethane.

6. The lock washer is claimed in claim 1 which is molded of relatively soft deformable plastic.

7. A unitary molded plastic lock washer for securing threadedly coupled members having an annular body portion with opposite faces for engaging the coupled members and a cylindrical aperture therethrough, one of said faces being relatively flat and the other having a flat inner portion and an outer portion curving towards the edge of said one face, a plurality of elongated projections formed on the curved outer portion of said other face, said projections extending generally radially with respect to said aperture and having their outer ends in a plane parallel to said inner portion of said other face and spaced outwardly therefrom for engaging a coupled member.

8. The lock washer as claimed in claim 7 in which the said projections are generally conically shaped with their larger ends being their connected ends.

9. The lock washer as claimed in claim 7 which is molded of polyurethane.

10. The lock washer as claimed in claim 7 which is molded of relatively soft deformable plastic.

* * * * *